Dec. 23, 1941.　　　W. F. FREIDAG　　　2,267,499
NUTCRACKER
Filed Dec. 29, 1939　　　2 Sheets-Sheet 1
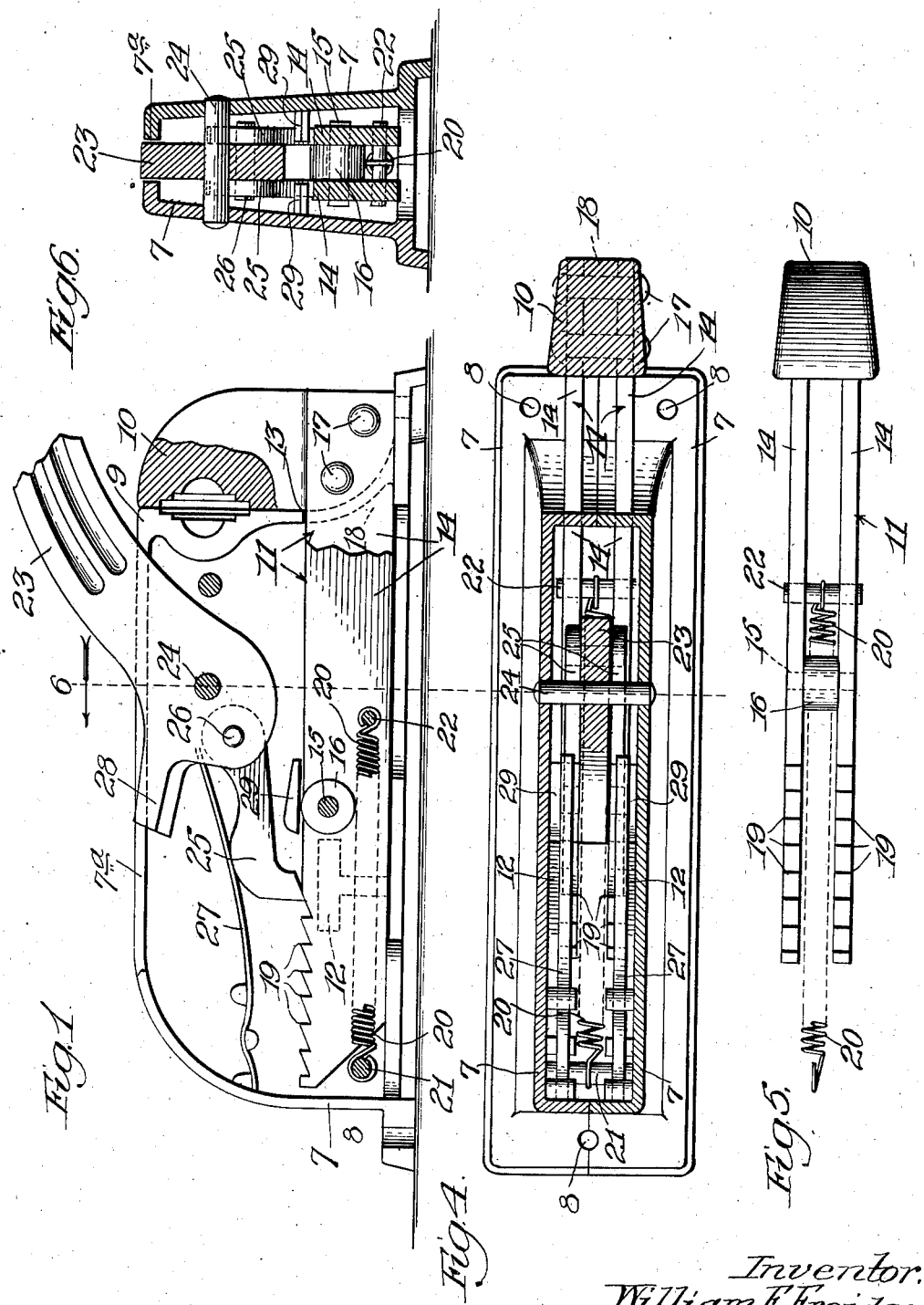
Inventor:
William F. Freidag,
By Chritton, Wiles, Davies, Hirsch & Dawson,
Attys.

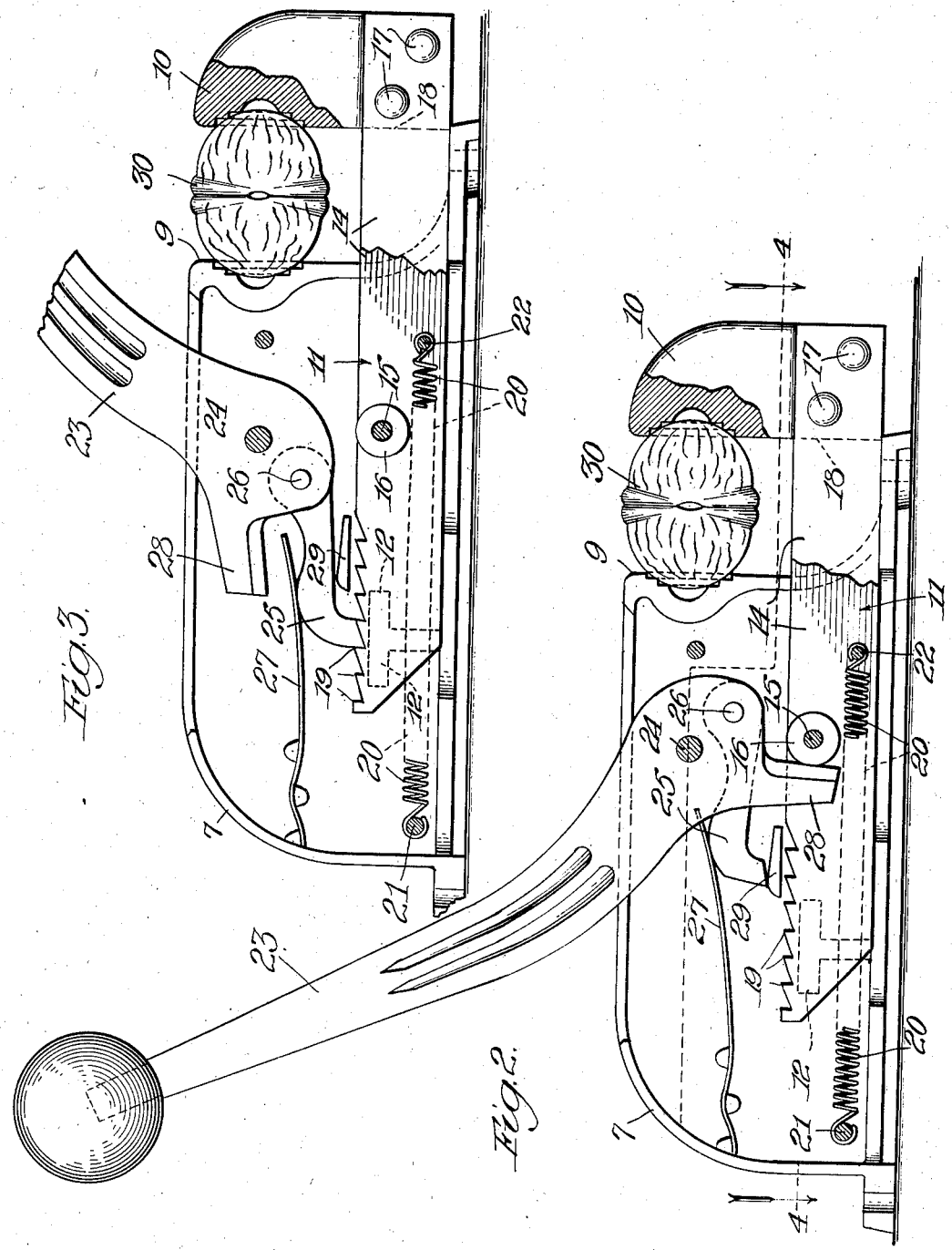

Patented Dec. 23, 1941

2,267,499

UNITED STATES PATENT OFFICE 2,267,499

NUTCRACKER

William F. Freidag, Freeport, Ill., assignor to Arcade Manufacturing Company, Freeport, Ill., a corporation of Illinois Application December 29, 1939, Serial No. 311,641

10 Claims. (Cl. 146—16)

My object generally is to provide improvements in nut crackers to the end that they will better perform the functions for which they are provided; more especially my objects are to provide a construction of nut cracker by which it is practically impossible to smash a nut and ruin the kernel; to provide a simple and economical construction of nut cracker adapted to perform its functions in a highly satisfactory manner; and other objects as will be manifest from the following description.

Referring to the accompanying drawings:

Figure 1 is a view in vertical sectional elevation of a nut cracker embodying my invention, the parts of the device being shown in normal condition.

Figure 2 is a similar view of the nut cracker showing positions occupied by the parts of the device after actuation for opening the jaws to receive a nut to be cracked and shown positioned in place.

Figure 3 is a similar view of the nut cracker showing the parts in a position ready to start applying cracking pressure to the nut.

Figure 4 is a plan sectional view taken at the irregular line 4—4 on Fig. 2 and viewed in the direction of the arrows.

Figure 5 is a plan view of the movable jaw of the device with its actuating spring; and Figure 6, a section taken at the line 6 on Fig. 1 and viewed in the direction of the arrow.

The particular construction shown comprises a casing or main frame 7 the bottom of which has apertures 8 for screws to attach it to a support, as for example a table top, the casing 7, shown as formed of two sections, forming a complete closure for the mechanism hereinafter described.

One end 9 of the casing forms one of the jaws of the device, the other jaw, represented at 10, and alined with the jaw 9, being carried on the outer end of a slide 11 extending into the casing 7 and guided in its movements by guides 12 rising from the bottom of the casing and by the walls of a slot 13 in the casing 7.

The slide 11 is shown as formed of two parallel bars 14 secured together in spaced relation between their ends by a shouldered pin 15 carrying a roller 16 located between the bars 14 and by rivets 17 extending through the bars 14 and a lug 18 on the jaw 10 depending between these bars, each of the bars being formed on their upper edges at their rear ends with similarly disposed ratchet teeth 19 forming a rack.

A coil spring 20 connected at one end to a pin 21 in the casing 7 and at its other end to a pin 22 on the slide 11, serves to yieldingly hold the slide in jaw-closed position (Fig. 1) and return the slide to this position when actuated therefrom and unrestrained, the pin 22 projecting beyond the sides of the slide 11 and preventing accidental disengagement of the slide from the casing 7 by engaging the end wall of the casing should the slide be accidentally drawn out too far.

The device also comprises an actuating lever 23 fulcrumed on a pin 24 in the casing 7 and projecting through an elongated slot 7a in the casing, the end walls of this slot limiting the movements of the lever in opposite directions. The lever 23 is provided with a pair of pawls or dogs 25 located at opposite sides of the lever and pivoted thereto on the ends of a pin 26 on the lever eccentric to the pin 24, these pawls being provided for cooperation with the rack 19. A pair of leaf springs 27 secured at one end to the casing 7 with their free ends engaging the outer ends of the pawls 25, respectively, constantly urge the pawls toward the rack 19 and ensures the proper functioning of the pawls in any position of the device, vertically or horizontally.

The lever is also provided with a lug-extension 28 which in the movements of the lever 23 moves between the pawls 25 and the bars 19 into and out of engagement with the roller 16.

Extending beneath the pawls 25 are lugs 29 on the sides of the casing 7 which cooperate with the pawls as hereinafter described.

In the normal condition of the device the jaws 9 and 10 are closed and the lever 23 and the pawls 25 occupy the positions shown in Fig. 1.

To use the device the operator swings the lever 23 from the position shown in Fig. 1 to the left in this figure, with the result of engaging the lug 28 with the roller 16 and through this engagement moving the slide 11 and with it the jaw 10 to the right in this figure against the action of the spring 20 to wide-open-jaw condition. The nut to be cracked, as for example the English walnut shown at 30 is then inserted between the jaws and pressure by the operator on the lever 23, released whereupon the jaw 10 moves toward closed position by the action of the spring 20 and holds the nut in place (Fig. 2), the pawls 25 in this position of the parts of the device resting upon the lugs 29 and the lever 23 assuming an intermediate position.

To crack the nut the operator swings the lever 23 to the right (Fig. 2) in which operation the pawls 25 move out of engagement with the lugs 29 and engage the teeth on the slide-rack 11 thereby, in the continued movement of the lever 23 to the right, operating to force the slide-rack 11 and the jaw 10 to the left in Fig. 2 for applying cracking pressure to the nut, which in cracked condition is removed from the device by the operator swinging the lever 23 to the left to free the nut.

While a full movement of lever 23, in actuating the device to fully-open-jaw condition, produces a long movement of the rack-slide 11 to accommodate nuts of widely varying sizes, a full movement of lever 23 back to its normal position produces a relatively short movement of the rack-slide in engagement at its jaw 10 with the nut, and therefore the possibility of smashing the nut and injuring the kernel is minimized.

As will be understood, if repeated application of cracking pressure to the nut is required to properly crack the nut this may be effected by again swinging the lever 23 in opposite directions, the lever 23 in each return movement toward normal position actuating the slide rack 12 a relatively short distance only.

The lever 23 being centrally located in the casing 7 and the pawls 25 being an equal distance on each side of the lever, uniform pressure will be exerted by the pawls against the rack-slide in the nut-cracking movement of the lever.

Furthermore, inasmuch as the lever 23 serves as the actuator for moving the jaw 10 in both directions it allows the free use of one hand at all times for the insertion or removal of the nut.

While I have illustrated and described a particular embodiment of my invention I do not wish to be understood as intending to limit it thereto as the same may be variously modified and altered and the invention embodied in other forms of structure without departing from the spirit of the invention.

What I claim as new and desire to secure by Letters Patent is:

1. A nut cracker comprising a fixed jaw and a movable jaw having a rack, a movable member, cooperating portions on said member and movable jaw adapted when said member is moved in one direction to move said movable jaw away from said fixed jaw, a pawl actuated by said member and engaging said rack in the movement of said member in the opposite direction to force said movable jaw toward said fixed jaw, and means preventing said pawl from engaging with said rack during the first-referred-to movement of said member but permitting said pawl to engage said rack in the last-referred-to movement of said member.

2. A nut cracker comprising a fixed jaw and a movable jaw having a rack, a spring yieldingly forcing said movable jaw toward said fixed jaw, a movable member, cooperating portions on said member and movable jaw adapted when said member is moved in one direction to move said movable jaw away from said fixed jaw against the tension of said spring, and a pawl actuated by said member and engaging said rack in the movement of said member in the opposite direction to force said movable jaw toward said fixed jaw.

3. A nut cracker comprising a fixed jaw and a movable jaw having a rack, a spring yieldingly forcing said movable jaw toward said fixed jaw, a movable member, cooperating portions on said member and movable jaw adapted when said member is moved in one direction to move said movable jaw away from said fixed jaw against the tension of said spring, and a pawl actuated by said member and engaging said rack in the movement of said member in the opposite direction to force said movable jaw toward said fixed jaw, and means preventing said pawl from engaging with said member during the first-referred-to-movement of said member, but permitting said pawl to engage said rack in the last-referred-to movement of said member.

4. A nut cracker comprising a fixed jaw and a movable jaw having a rack, a rock member, cooperating portions on said member and movable jaw adapted when said rock member is moved in one direction to move said movable jaw away from said fixed jaw, and a pawl actuated by said movable member and engaging said rack in the movement of said rock member in the opposite direction to force said movable jaw toward said fixed jaw.

5. A nut cracker comprising a fixed jaw and a movable jaw having a rack, a movable member, cooperating portions on said member and movable jaw adapted when said member is moved in one direction to move said movable jaw away from said fixed jaw, and a pawl pivoted on said movable member and engaging said rack in the movement of said member in the opposite direction to force said movable jaw toward said fixed jaw.

6. A nut cracker comprising a fixed jaw and a movable jaw having a rack, a movable member, cooperating portions on said member and movable jaw adapted to move said movable jaw away from said fixed jaw after initial movement of said member in one direction, and a pawl actuated by said member and engaging said rack in the movement of said member in the opposite direction to force said movable jaw toward said fixed jaw.

7. A nut cracker comprising, in combination: a pair of relatively movable jaws; a lever pivotally connected to one of said jaws providing a long and a short arm; means on said short arm relatively distant from the pivot, coacting with the remaining jaw to cause relatively rapid movement of separation of the jaws when the lever is moved in one direction; and means on said short arm relatively near said pivot, coacting with said remaining jaw to cause relatively slow movement of closing of said jaws, when the lever is moved in the opposite direction.

8. A nut cracker comprising a pair of jaws one of which is slidable on the other thereof, a spring operating to yieldingly hold said jaws against separation, and an actuating member pivoted to the non-sliding jaw having a part for engaging said movable jaw in its movement in one direction to move said movable jaw away from the other jaw to receive a nut to be cracked, and another part engageable with said jaw in the movement of said member in the opposite direction for forcing said movable jaw toward said other jaw and against the nut to be cracked.

9. A nut cracker comprising, in combination: a pair of relatively movable jaws; yielding means urging said jaws toward nut-embracing position; a jaw actuating member; jaw opening means associated with said member operable by a movement of said member; and jaw closing means associated with said member operable by a different movement of said member to forcibly urge the jaws toward each other to crack a nut placed therebetween.

10. A nut cracker comprising a pair of jaws one of which is slidable on the other thereof, a spring operating to yieldingly hold said jaws against separation, an actuating member, a part carried by said member engaging said movable jaw in the movement of the part in one direction acting to move said movable jaw away from the other jaw to receive a nut to be cracked, and another part carried by said member engageable with said jaw in the movement of said member in the opposite direction acting to force said movable jaw toward said other jaw and against the nut to be cracked.

WILLIAM F. FREIDAG.